US010853728B1

United States Patent
Walters et al.

(10) Patent No.: US 10,853,728 B1
(45) Date of Patent: Dec. 1, 2020

(54) AUTOMATED DATA INGESTION USING AN AUTOENCODER

(71) Applicant: Capital One Services, LLC, McLean, VA (US)

(72) Inventors: Austin Grant Walters, Savoy, IL (US); Jeremy Edward Goodsitt, Champaign, IL (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 16/549,465

(22) Filed: Aug. 23, 2019

(51) Int. Cl.
*G06N 3/08* (2006.01)
*G06F 16/25* (2019.01)

(52) U.S. Cl.
CPC .......... *G06N 3/088* (2013.01); *G06F 16/258* (2019.01)

(58) Field of Classification Search
CPC .............................. G06N 3/088; G06F 16/258
See application file for complete search history.

(56) References Cited

U.S. PATENT DOCUMENTS 10,417,556 B1 * 9/2019 Fairbank ................. G06N 3/08
2015/0242747 A1 * 8/2015 Packes ................. G06N 3/0454
706/17
2016/0371316 A1 * 12/2016 Okanohara .......... G06N 3/0454
2018/0197089 A1   7/2018 Krasser et al.
2018/0314917 A1   11/2018 Mehr et al.

FOREIGN PATENT DOCUMENTS

WO    2019118644 A1    6/2019

OTHER PUBLICATIONS

Haved, Haseeb, M. Xiaoyi Lu, and Dhabaleswar K. (DK) Panda. "Characterization of Big Data Stream PRocessing Pipeline: A case study isuing Flink and Kafka" 2017 [Online] DOwnloaded Nov. 22, 2019 https://dl.acm.org/citation.cfm?id=3148068 (Year: 2017).*

* cited by examiner

*Primary Examiner* — Ben M Rifkin (57) ABSTRACT

Systems, methods, apparatuses, and computer program products to generate, by a computing model, a transformed dataset based on a first dataset comprising numeric values, the computing model to convert the numeric values from a first format to a second format, generate a training dataset comprising the first dataset as an input dataset and the transformed dataset as an output dataset, train an autoencoder comprising a latent vector to transform the input dataset from the first format to the second format, determine, by a statistical model based on an output of the trained autoencoder and the input dataset, an accuracy of the trained autoencoder, and determine that the accuracy of the trained autoencoder exceeds a threshold accuracy.

20 Claims, 6 Drawing Sheets

AUTOMATED DATA INGESTION USING AN AUTOENCODER

TECHNICAL FIELD

Embodiments disclosed herein generally relate to deep learning, and more specifically, to training an autoencoder to perform automated data ingestion.

BACKGROUND

Input data is often received in different formats. Data engineering involves converting the format of input data to a desired format. However, data engineering is conventionally a manual process which requires significant time and resources. Furthermore, data engineering solutions are not portable, such that a new solution needs to be manually designed for different types of input data and/or desired output formats.

SUMMARY

Embodiments disclosed herein provide systems, methods, articles of manufacture, and computer-readable media for training an autoencoder to perform automated data ingestion. In one example, a computing model may generate a transformed dataset based on a first dataset comprising numeric values, the computing model to convert the numeric values from a first format to a second format. A training dataset comprising the first dataset as an input dataset and the transformed dataset as an output dataset may be generated. An autoencoder comprising a latent vector may be trained to transform the input dataset from the first format to the second format. A statistical model based on an output of the trained autoencoder and the input dataset may determine an accuracy of the trained autoencoder and determine that the accuracy of the trained autoencoder exceeds a threshold accuracy.

DETAILED DESCRIPTION

Embodiments disclosed herein provide techniques to use an autoencoder to automatically format input data according to a desired output format. Generally, embodiments disclosed herein may sample a dataset. A statistical model (or other machine learning (ML) model) may format the data sampled from the dataset, thereby generating a formatted output dataset. A training dataset may then be used to train the autoencoder to format data. The training dataset may include the data sampled from the dataset as an input dataset and the formatted output dataset generated by the statistical model as an output dataset. The training dataset may include overlapping "chunks" such that the same data may appear in two or more chunks. Generally, during training, the autoencoder attempts to format the input dataset, thereby generating an output. The statistical model (or other ML model) may analyze the output of the autoencoder to determine an accuracy of the autoencoder. The determined accuracy of the autoencoder may then be used to train the values of a latent vector of the autoencoder. The training of the autoencoder may be repeated until the accuracy of the autoencoder exceeds a threshold. The trained autoencoder may then be used for data ingestion, e.g., by attaching the trained autoencoder to all new models and/or datasets.

Advantageously, embodiments disclosed herein provide techniques to automatically format data using an autoencoder. Advantageously, the autoencoder may be trained to appropriately format all data, even if the data has not been previously analyzed. Furthermore, embodiments disclosed herein provide scalable solutions that can be ported to any type of data processing pipeline, regardless of any particular input and/or output data formats. Further still, embodiments disclosed herein may train the autoencoder using only the training dataset and/or a portion thereof.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

Figure 1:
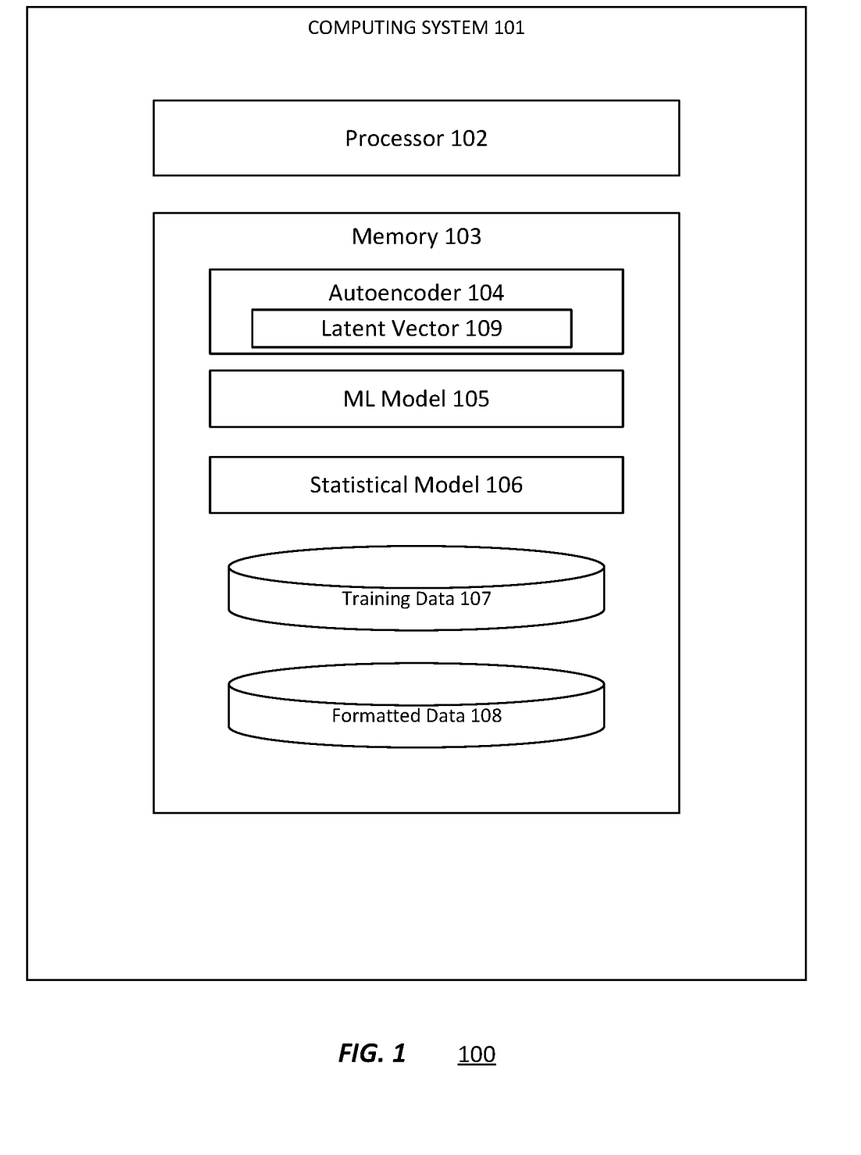
FIG. 1 illustrates an embodiment of a system that uses an autoencoder to perform automated data ingestion.

FIG. 1 depicts an exemplary system 100, consistent with disclosed embodiments. As shown, the system 100 includes a computing system 101. The computing system 101 is representative of any type of computing system, such as servers, compute clusters, desktop computers, smartphones, tablet computers, wearable devices, laptop computers, workstations, portable gaming devices, virtualized computing systems, and the like. The computing system 101 includes a processor 102, a memory 103, and may further include a storage, network interface, and/or other components not pictured for the sake of clarity.

As shown, the memory 103 includes an autoencoder 104, a machine learning (ML) model 105, a statistical model 106, and data stores of training data 107 and formatted data 108. The autoencoder 104 is representative of any type of autoencoder, including variational autoencoders, denoising autoencoders, sparse autoencoders, and contractive autoencoders. Generally, an autoencoder is a type of artificial neural network that learns data codings (e.g., the latent vector 109) in an unsupervised manner. Values of the latent vector 109 (also referred to as a code, coding, latent variables, and/or latent representation) may be learned (or refined) during training of the autoencoder 104, thereby training the autoencoder 104 to format input data according to a desired output format (which may include formatting according to a desired operation). Stated differently, the trained autoencoder 104 may approximate any function and/or operation applied to input data. As one example, the autoencoder 104 may convert input data comprising integer values to floating point values. More generally, the autoencoder 104 may perform any encoding operation, which may include, but is not limited to, normalizing values of input data, computing a z-score (e.g., a signed value reflecting a number of standard deviations the value of input data is from a mean value) for values of input data, standardizing values of input data, recasting values of input data, filtering the input data according to one or more filtering criteria, fuzzing of the values of input data, applying statistical filters to the input data, and the like. The use of any particular type of encoding operation as a reference example herein should not be considered limiting of the disclosure, as the disclosure is equally applicable to all types of encoding operations. Similarly, the use of the term "vector" to describe the latent vector 109 should not be considered limiting of the disclosure, as the latent vector 109 is also representative of a matrix having multiple dimensions (e.g., a vector of vectors).

To train the autoencoder 104, one or more datasets of training data 107 may be generated. In one embodiment, the training data 107 comprises columnar and/or row-based data, e.g., one or more columns of integer values, one or more columns of floating point values, etc. Generally, the training data 107 may be representative of multiple datasets of any size. For example, the training data 107 may include 50 column-based datasets, where each dataset has thousands of records (or more). Furthermore, the training data 107 may be segmented (e.g., the training data 107 may comprise a plurality of segments of one or more datasets). In one embodiment, each segmented dataset of training data 107 is overlapping, such that at least one value of the training data 107 appears in at least two segments. For example, a first dataset may include rows 0-1000 of the training data 107, while a second dataset may include rows 900-2000 of the training data 107, such that rows 900-1000 appear in the first and second datasets. In one embodiment, the size of the datasets may be learned based on hyperparameter tuning.

The ML model 105 and the statistical model 106 are representative of any type of computing model, such as deep learning models, machine learning models, neural networks, classifiers, clustering algorithms, support vector machines, and the like. In one embodiment, the ML model 105 and the statistical model 106 comprise the same model. Generally, the ML model 105 (and/or the statistical model 106) may be configured to transform (or encode) input data to a target format, thereby generating an output dataset. For example, the ML model 105 may be configured to normalize integer values of input data to floating point values, and the output dataset may comprise the floating point values. Generally, the ML model 105 may compute an output dataset for each input dataset of training data 107. An input dataset and corresponding formatted output dataset generated by the ML model 105 may be referred to as a "training sample" herein.

The autoencoder 104 may then be trained using the input dataset of one or more training samples. Generally, the autoencoder 104 may receive the input dataset as input, convert the dataset to an encoded format using the values of the latent vector 109, and decode the converted dataset. In some embodiments, the converted dataset generated by the autoencoder 104 may then be compared to the formatted data of the training sample generated by the ML model 105. The comparison may include determining a difference and/or least squared error of the converted dataset generated by the autoencoder 104 and the formatted data of the training sample generated by the ML model 105. Doing so generates one or more values reflecting an accuracy of the autoencoder 104. In some embodiments, the accuracy may comprise a loss of the autoencoder 104.

In some embodiments, the ML model 105 and/or the statistical model 106 may receive the converted data generated by the autoencoder 104 to determine the accuracy of the autoencoder 104 relative to the data of the training sample generated by the ML model 105. For example, the ML model 105 may process the converted data generated by the autoencoder 104 and compare the output to the formatted data of the training sample. In another embodiment, the statistical model 106 may classify the converted data generated by the autoencoder 104 and compare the classification to a classification of the input dataset of the training sample. For example, the statistical model 106 may classify the formatted output generated by the autoencoder 104 as a dataset of credit card data. If the statistical model classifies the input dataset of the training sample as being credit card data, the statistical model 106 may compute a relatively high accuracy value for the autoencoder 104. If, however, the classification for the input dataset is for purchase order amounts, the statistical model 106 may compute a relatively low accuracy value for the autoencoder 104. In one embodiment, the statistical model 106 may compute the accuracy value for the autoencoder 104 based on a distance between the classifications in a data space, where the accuracy increases as the distance between the classifications decreases.

The determined accuracy of the autoencoder 104 may then be used to refine the values of the latent vector 109 and/or other components of the autoencoder 104 via a backpropagation operation. The backpropagation may be performed using any feasible backpropagation algorithm. Generally, during backpropagation, the values of the latent vector 109 and/or the other components of the autoencoder 104 are refined based on the accuracy of the formatted output generated by the autoencoder 104. Doing so may result in a latent vector 109 that most accurately maps the input data to the desired output format.

The training of the autoencoder 104 may be repeated any number of times until the accuracy of the autoencoder 104 exceeds a threshold (and/or the loss of the autoencoder 104 is below a threshold). The autoencoder 104 may then be configured to ingest (e.g., format) data to be processed in any processing platform, such as a streaming data platform, thereby generating the formatted data 108. In some embodiments, the autoencoder 104 may perform estimated ingestion operations. For example, the autoencoder 104 may receive streaming data over a time interval. If the streaming data is of a reasonable size, the autoencoder 104 may perform a predictive formatting operation on the streaming data. For example, by ingesting enough streaming data during the time interval, the autoencoder 104 may determine the minimum and maximum values therein. Doing so may allow the autoencoder 104 to normalize the streaming data in a predictive fashion in a single pass. Stated differently, the autoencoder 104 may normalize the streaming data in a single processing phase, rather than having to process the streaming data twice (e.g., to discover the minimum/maximum values, then normalize the data based on the identified minimum/maximum values).

Figure 2:
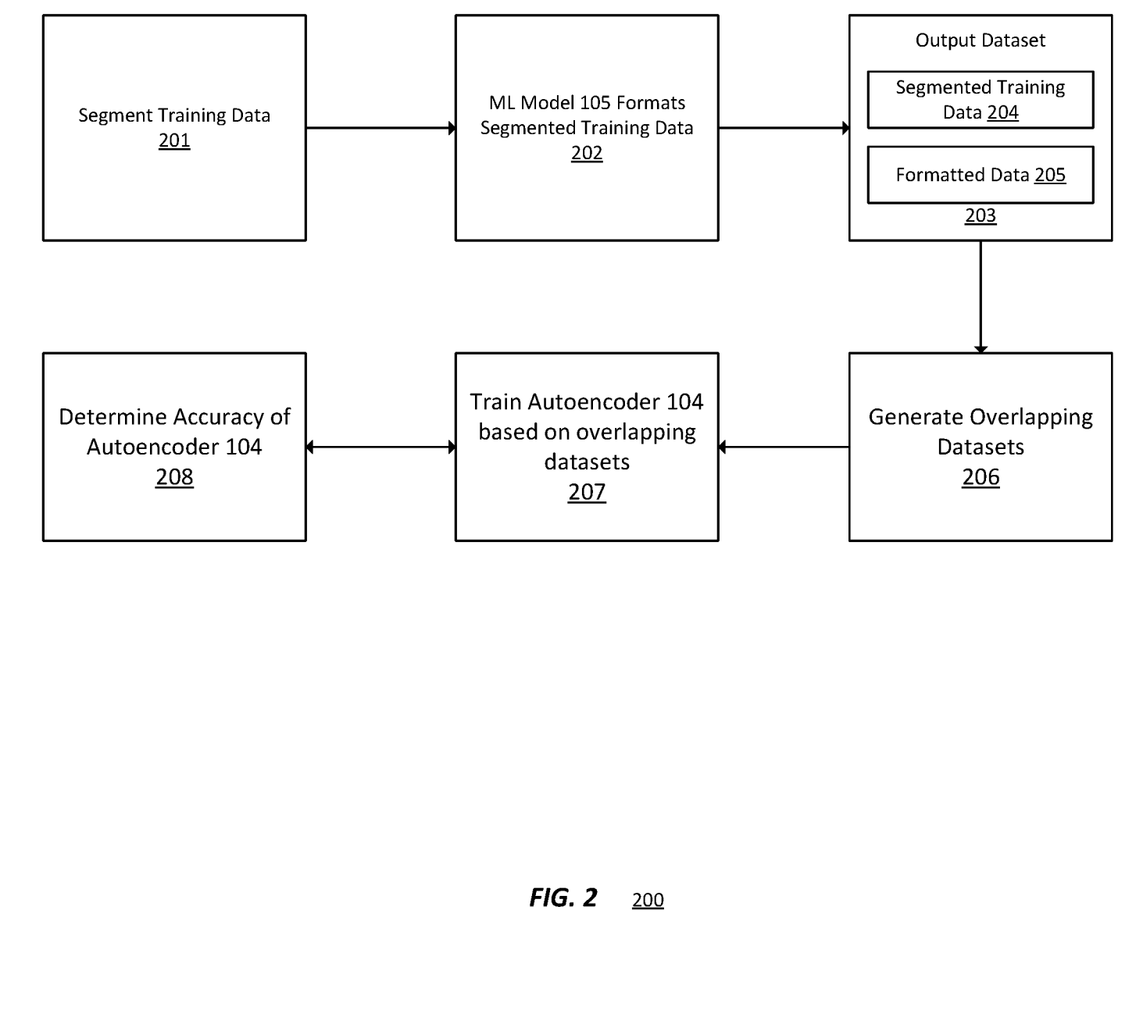
FIG. 2 illustrates an embodiment of training an autoencoder to perform automated data ingestion.

FIG. 2 is a schematic 200 illustrating an embodiment of training the autoencoder 104 to perform automated data ingestion. As shown, at block 201, one or more datasets of training data 107 may be segmented. The training data 107 may include row-based data and/or column-based data. The segments may have a minimum size (e.g., 10,000 rows and/or columns of data). In some embodiments, one or more of the segments may be modified, for example, by dropping one or more columns of data, formatting one or more columns of data, and the like. Doing so may produce varying segments of training data 107, e.g., where a first segment has had a column dropped, a second segment has had a column formatted, a third segment has had one column dropped and one column formatted, and a fourth segment has not been modified.

At block 202, the ML model 105 may process the segmented training data 107 to format the segmented training data 107 according to one or more formatting rules and/or operations. For example, the ML model 105 may normalize, convert, and/or filter the segmented training data 107. At block 203, one or more output datasets generated by the ML model 105 at block 202 may be stored. The output datasets may include each segment of training data 204 and the corresponding formatted data 205 generated by the ML model 105 at block 202. For example, if 1,000 segments of training data were generated at block 201, the segmented training data 204 may include the 1,000 segments, while the formatted data 205 may include 1,000 formatted datasets generated by the ML model 105 by processing each segment at block 202. In such an example, 1,000 training samples may comprise the segmented training data as input data and the corresponding formatted data 205 generated by the ML model 105.

At block 206, overlapping datasets may be generated using the training samples of segmented training data 204 and formatted data 205. Continuing with the previous example, the 1,000 training samples may be modified to include overlapping values. At block 207, the autoencoder 104 may be trained using the overlapping datasets generated at block 206. For example, the autoencoder 104 may process each input dataset (e.g., the segmented training data 204) of each training sample, e.g., to convert each of the input datasets of the training samples to a desired output format and/or based on a predefined operation. At block 208, the accuracy of the autoencoder 104 is determined based on the output generated by the autoencoder 104 at block 207. For example, a difference and/or a least squared error may be computed between the output of the autoencoder 104 based on the segmented training data 204 and the corresponding formatted data 205 generated by the ML model 105. The difference and/or least squared error may be used as accuracy values for the autoencoder 104.

As another example, the statistical model 106 may classify the output generated by the autoencoder 104 at block 207 and compare the generated classification to a classification of the corresponding segmented training data 204. For example, if the output generated by the autoencoder 104 at block 207 for a first overlapping segment of training data 204 matches a classification generated for the formatted data 205 corresponding to the first overlapping segment of training data 204, the statistical model 106 may compute a relatively high accuracy value for the autoencoder 104 for the first training sample.

The determined accuracy may be used to train the autoencoder 104 via a backpropagation operation. Doing so refines the values of the autoencoder 104, including the latent vector 109, based on the determined accuracy values for the autoencoder 104 and/or a loss of the autoencoder 104. Generally, the accuracy at block 208 may be determined for each training sample. Therefore, continuing with the previous example, the accuracy for each of the 1,000 training samples processed by the autoencoder 104 may be determined at block 208. Each of the 1,000 accuracy values may be provided to the autoencoder 104 to update the weights of the autoencoder 104, e.g., via 1,000 (or fewer) backpropagation operations.

Figure 3:
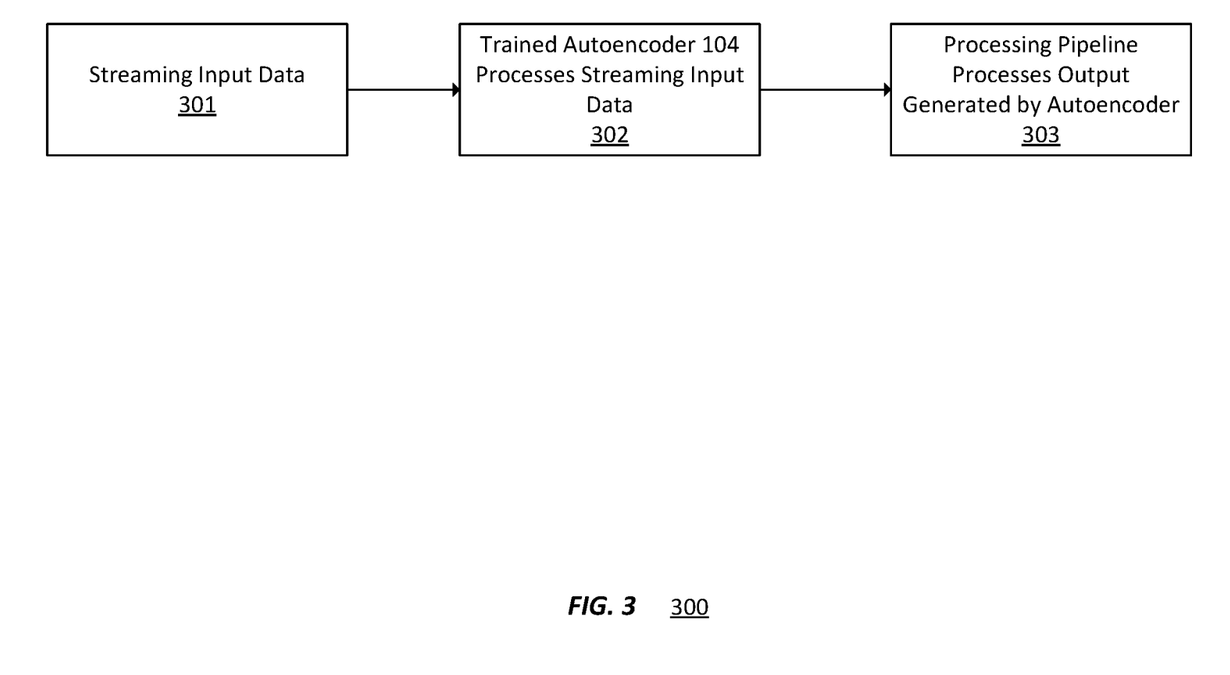
FIG. 3 illustrates an embodiment of a processing pipeline.

FIG. 3 illustrates an embodiment of a processing pipeline 300. At block 301, streaming input data is received in the processing pipeline 300. The streaming input data may be any type of data, such as transaction data, stock ticker data, financial data, sensor data, and the like. In some embodiments, the streaming input data includes numeric values in one or more rows and/or columns. However, the streaming input data may have varying types and/or formats which may need to be modified to be compatible with various components of the processing pipeline. Therefore, at block 302, the trained autoencoder 104 may process the streaming input data. For example, the trained autoencoder 104 may format the streaming input data according to a desired output format, normalize the values of the streaming input data, compute a z-score for the streaming input data, standardizing values of the streaming input data, recasting values of the streaming input data, filtering the streaming input data according to one or more filtering criteria, fuzzing of the values of the streaming input data, and the like. At block 303, one or more components of the processing pipeline process the output generated by the autoencoder 104 at block 302, e.g., the formatted and/or converted streaming input data. Advantageously, the autoencoder 104 may process the streaming data in a single pass, e.g., by providing estimated normalization, recasting, etc., and without having to process the streaming data in two or more passes.

Figure 4:
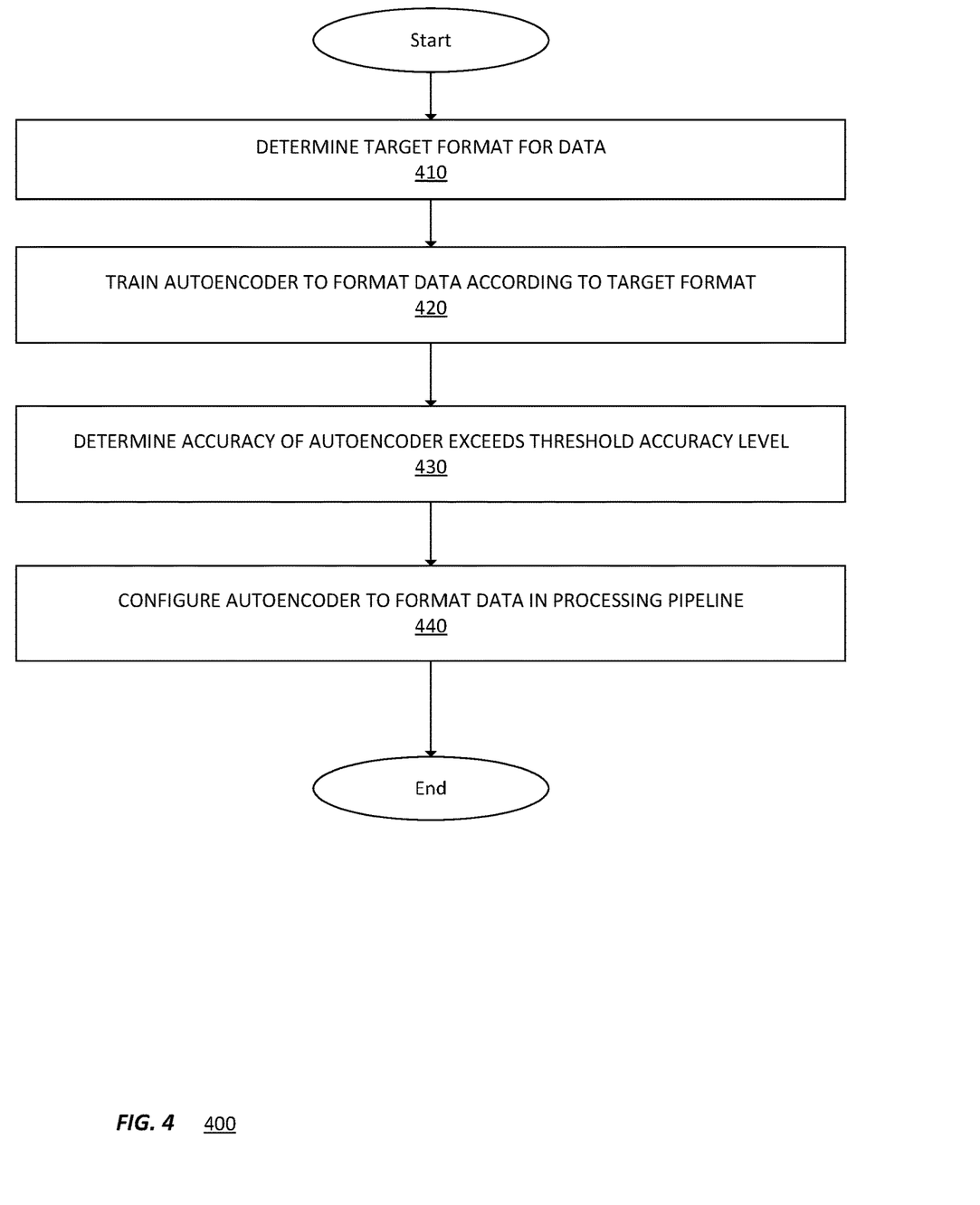
FIG. 4 illustrates an embodiment of a first logic flow.

FIG. 4 illustrates an embodiment of a logic flow 400. The logic flow 400 may be representative of some or all of the operations executed by one or more embodiments described herein. For example, the logic flow 400 may include some or all of the operations to provide automated data ingestion using an autoencoder. Embodiments are not limited in this context.

As shown, the logic flow 400 begins at block 410, where a target data format is determined for data. For example, the target format may specify a datatype (e.g., integers, floating points, etc.), a data space (e.g., a range of values), etc. More generally, any type of operation may be determined for the data at block 410, e.g., normalization, filtering, score computation, etc. At block 420, the autoencoder 104 is trained to format data according to the target formats and/or operations defined at block 410. Generally, the training of the autoencoder 104 is guided by the ML model 105 and/or the statistical model 106 as described in greater detail herein. At block 430, the accuracy of the autoencoder 104 may be determined to exceed a threshold accuracy level. For example, if the threshold is 90% accuracy, and the accuracy of the autoencoder 104 is 95%, the accuracy of the autoencoder may exceed the threshold. At block 440, the autoencoder 104 is configured to format data in a processing pipeline.

Figure 5:
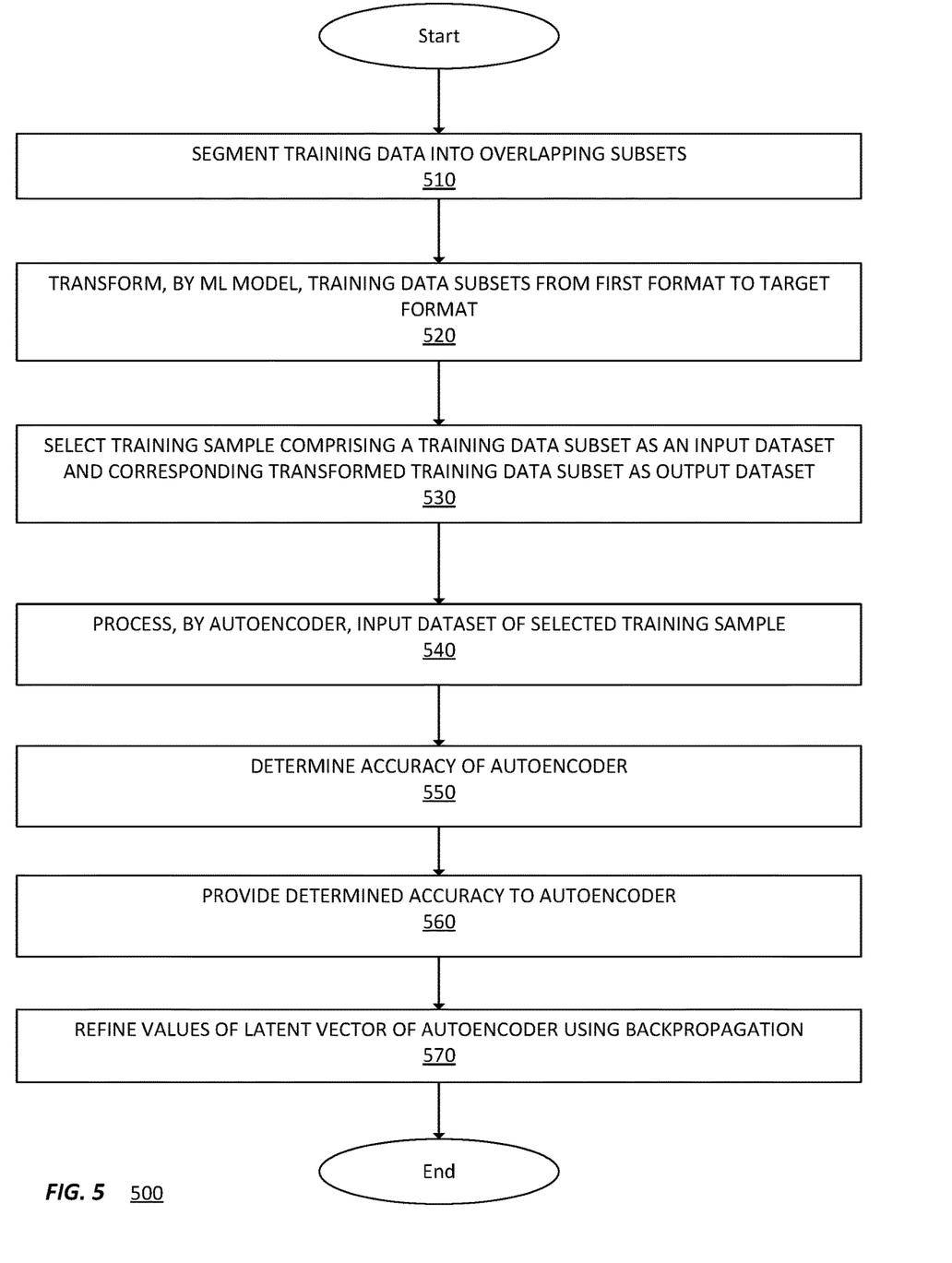
FIG. 5 illustrates an embodiment of a second logic flow.

FIG. 5 illustrates an embodiment of a logic flow 500. The logic flow 500 may be representative of some or all of the operations executed by one or more embodiments described herein. For example, the logic flow 500 may include some or all of the operations performed to train the autoencoder 104. Embodiments are not limited in this context.

As shown, the logic flow 500 begins at block 510, where the training data 107, which may comprise one or more datasets, is segmented into overlapping training data subsets. As stated, the training data 107 may include row and/or column-based numerical values. By generating overlapping subsets, one or more values of the training data 107 may appear in two or more subsets. At block 520, the ML model 105 transforms the training data subsets according to the format defined at block 410. For example, the ML model 105 may be configured to transform the training data from a first format to a second format. More generally, the ML model 105 may perform any operation on the training data as described above. Doing so may generate a respective transformed output dataset for each of the training data subsets. Each training dataset and corresponding transformed output dataset pair may comprise a training sample for the autoencoder. One or more of the training samples may be selected at block 530.

At block 540, the autoencoder 104 may process the input dataset of the training sample selected at block 530. Generally, the autoencoder 104 may transform the input dataset of the training sample (or perform any other operation) based at least in part on the current weights of the latent vector 109. Doing so may generate a transformed output. At block 550, the accuracy of the autoencoder 104 is determined based at least in part on the transformed output generated by the autoencoder 104. As stated, the ML model 105 and/or the statistical model 106 may be used to determine the accuracy of the autoencoder 104. For example, a difference and/or a least squared error may be computed for the output of the autoencoder 104 based on the transformed output dataset of the training sample (e.g., the output of the ML model 105) and the output generated by the autoencoder 104 at block 540. The difference and/or least squared error may be used as accuracy values for the autoencoder 104. As another example, the statistical model 106 may classify the output generated by the autoencoder 104 at block 540 and compare the generated classification to a classification of the training data of the input sample selected at block 530. The accuracy of the autoencoder 104 may then be determined based on a similarity of the classifications, where more similar classifications result in higher accuracy values for the autoencoder 104.

At block 560, the accuracy determined at block 550 may be provided to the autoencoder 104. At block 570, the values of the latent vector 109 and any other values of the autoencoder 104 may be refined during a backpropagation operation. Doing so may allow the values of the latent vector 109 to more accurately reflect a mapping required to perform the desired operation on data (e.g., filtering, formatting, recasting, etc.). If the accuracy of the autoencoder 104 determined at block 550 is lower than a threshold accuracy, the logic flow 500 may return to block 530, where another training sample is selected, thereby repeating the training process until the accuracy of the autoencoder 104 exceeds the threshold. Once the accuracy of the autoencoder 104 exceeds a threshold and/or all training samples have been used to train the autoencoder 104, the logic flow 500 may end.

Figure 6:
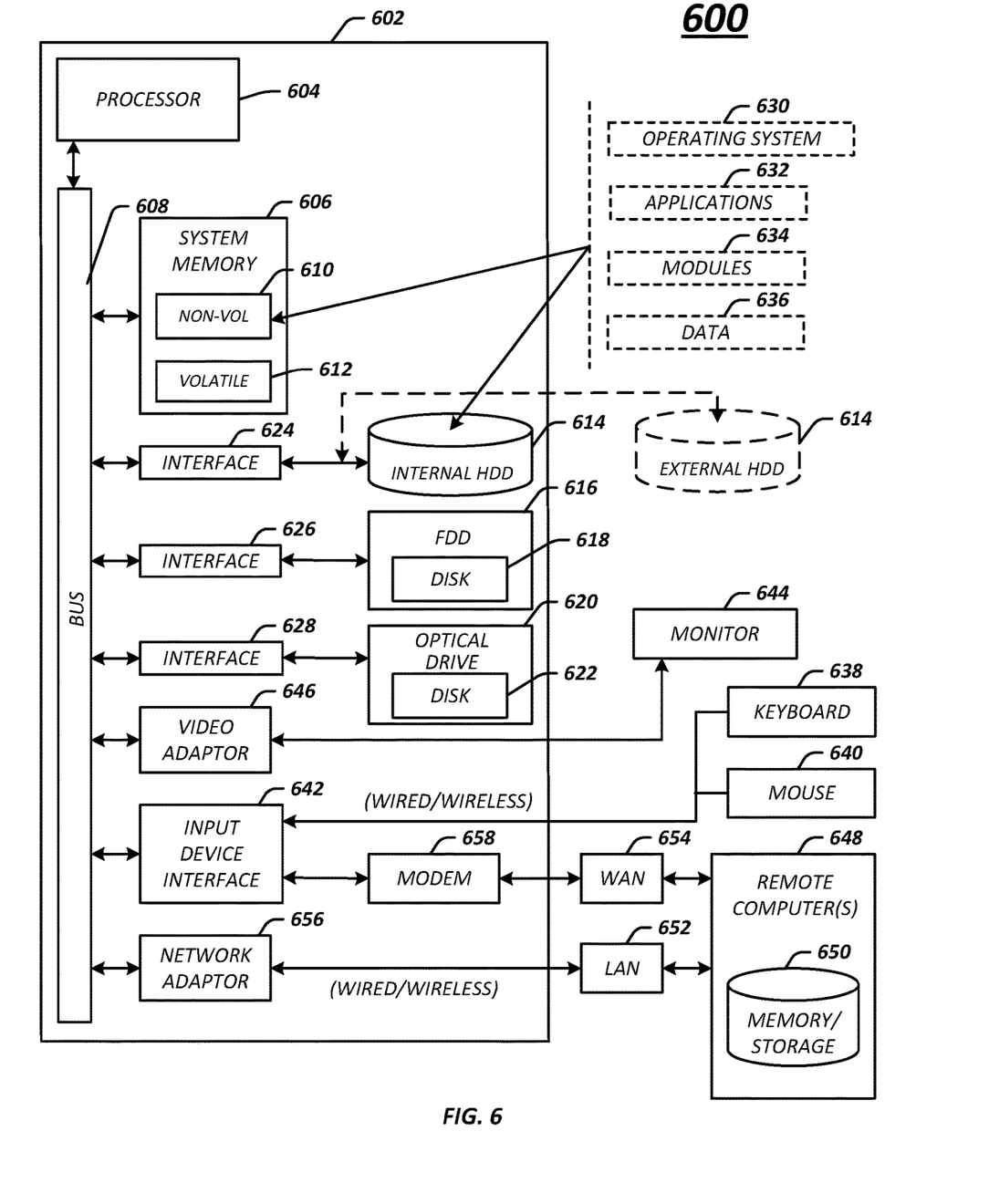
FIG. 6 illustrates an embodiment of a computing architecture.

FIG. 6 illustrates an embodiment of an exemplary computing architecture 600 comprising a computing system 602 that may be suitable for implementing various embodiments as previously described. In various embodiments, the computing architecture 600 may comprise or be implemented as part of an electronic device. In some embodiments, the computing architecture 600 may be representative, for example, of a system that implements one or more components of the system 100. In some embodiments, computing system 602 may be representative, for example, of the computing system 101 of the system 100. The embodiments are not limited in this context. More generally, the computing architecture 600 is configured to implement all logic, applications, systems, methods, apparatuses, and functionality described herein with reference to FIGS. 1-5.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 602 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 602.

As shown in FIG. 6, the computing system 602 comprises a processor 604, a system memory 606 and a system bus 608. The processor 604 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 604.

The system bus 608 provides an interface for system components including, but not limited to, the system memory 606 to the processor 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computing system 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies. The computing system 602 is generally is configured to implement all logic, systems, methods, apparatuses, and functionality described herein with reference to FIGS. 1-5.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the system 100, e.g., the autoencoder 104, ML model 105, statistical model 106, training data 107, formatted data 108, and latent vector 109.

A user can enter commands and information into the computing system 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computing system 602. In addition to the monitor 644, a computer typically includes other peripheral output devices, such as speakers, printers, and so forth.

The computing system 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computing system 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computing system 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computing system 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computing system 602, or portions thereof, can be stored in the remote memory/storage device 650. It will be appreciated that the network connections shown are exemplary and other means of establishing a communications link between the computers can be used.

The computing system 602 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A system, comprising:
   a processor circuit; and
   a memory storing instructions which when executed by the processor circuit, cause the processor circuit to:
   generate, by a computing model, a transformed dataset based on a first dataset comprising numeric values, the computing model to convert the numeric values from a first data type to a second data type;
   generate a training dataset comprising the first dataset as an input dataset and the transformed dataset as an output dataset;
   train an autoencoder comprising a latent vector to transform the input dataset from the first data type to the second data type;
   determine, by a statistical model based on an output of the trained autoencoder and the input dataset, an accuracy of the trained autoencoder;
   determine that the accuracy of the trained autoencoder exceeds a threshold accuracy;
   receive, by the trained autoencoder during a first time interval, streaming data comprising numeric values from a processing pipeline;
   determine, by the trained autoencoder during the first time interval, a maximum value and a minimum value of a first subset of the numeric values of the streaming data; and
   normalize, by the trained autoencoder during the first time interval, a second subset of the numeric values of the streaming data to be within the determined maximum and minimum values, wherein the trained autoencoder normalizes the second subset of the numeric values during the first time interval.

2. The system of claim 1, the first dataset comprising one or more of a row-based dataset having at least one row of numeric values and a column-based dataset having at least one column of numeric values, the accuracy of the trained autoencoder based on at least one of: (i) a difference of the output of the autoencoder and the output dataset, and (ii) a classification of the output of the trained autoencoder generated by the statistical model and a classification of the input dataset generated by the statistical model.

3. The system of claim 2, the memory storing instructions which when executed by the processor circuit, cause the processor circuit to:
- transform, by the trained autoencoder, streaming data from a processing pipeline from the first data type to the second data type; and
- provide, by the trained autoencoder, the transformed streaming data to the processing pipeline.

4. The system of claim 1, wherein the computing model further generates the transformed dataset based on one or more of: (i) normalizing the numeric values of the first data type to be within a range of values of the second data type, (ii) filtering the numeric values to remove at least one of the numeric values, (iii) computing a z-score for each of the numeric values, and (iv) performing an encoding operation on the numeric values, the memory storing instructions which when executed by the processor circuit, cause the processor circuit to:
- receive, by the autoencoder, the accuracy determined by the statistical model; and
- refine the latent vector of the autoencoder based at least in part on the received accuracy and a backpropagation operation.

5. The system of claim 1, the memory storing instructions which when executed by the processor circuit, cause the processor circuit to:
- generate a plurality of overlapping segments of the training dataset, each overlapping segment comprising at least one numerical value shared by at least one other overlapping segment, the autoencoder trained based on the plurality of overlapping segments of the training dataset.

6. The system of claim 1, the first dataset of a plurality of datasets, the computing model to generate a respective transformed dataset for each dataset of the plurality of datasets, the autoencoder trained based on the plurality of transformed datasets and the plurality of datasets.

7. The system of claim 1, the training of the autoencoder to comprise reduction of a loss of the autoencoder below a threshold loss value, the computing model comprising one of a neural network and a machine learning model.

8. A non-transitory computer-readable storage medium storing instructions that when executed by a processor cause the processor to:
- generate, by a computing model, a transformed dataset based on a first dataset comprising numeric values, the computing model to convert the numeric values from a first data type to a second data type;
- generate a training dataset comprising the first dataset as an input dataset and the transformed dataset as an output dataset;
- train an autoencoder comprising a latent vector to transform the input dataset from the first data type to the second data type;
- determine, by a statistical model, an accuracy of the trained autoencoder based on an output of the trained autoencoder and the input dataset; and
- determine that the accuracy of the trained autoencoder exceeds a threshold accuracy;
- receive, by the trained autoencoder during a first time interval, streaming data comprising numeric values from a processing pipeline;
- determine, by the trained autoencoder during the first time interval, a maximum value and a minimum value of a first subset of the numeric values of the streaming data; and
- normalize, by the trained autoencoder during the first time interval, a second subset of the numeric values of the streaming data to be within the determined maximum and minimum values, wherein the trained autoencoder normalizes the second subset of the numeric values during the first time interval.

9. The non-transitory computer-readable storage medium of claim 8, the first dataset comprising one or more of a row-based dataset having at least one row of numeric values and a column-based dataset having at least one column of numeric values, the accuracy of the trained autoencoder based on at least one of: (i) a difference of the output of the autoencoder and the output dataset, and (ii) a classification of the output of the trained autoencoder generated by the statistical model and a classification of the input dataset generated by the statistical model.

10. The non-transitory computer-readable storage medium of claim 9, storing instructions which when executed by the processor, cause the processor to:
- transform, by the trained autoencoder, streaming data from a processing pipeline from the first data type to the second data type; and
- provide, by the trained autoencoder, the transformed streaming data to the processing pipeline for further processing.

11. The non-transitory computer-readable storage medium of claim 8, storing instructions which when executed by the processor, cause the processor to:
- receive, by the autoencoder, the accuracy determined by the statistical model; and
- refine the latent vector of the autoencoder based at least in part on the received accuracy and a backpropagation operation.

12. The non-transitory computer-readable storage medium of claim 8, wherein the computing model further generates the transformed dataset based on one or more of: (i) normalizing the numeric values of the first data type to be within a range of values of the second data type, (ii) filtering the numeric values to remove at least one of the numeric values, (iii) computing a z-score for each of the numeric values, and (iv) performing an encoding operation on the numeric values.

13. The non-transitory computer-readable storage medium of claim 8, storing instructions which when executed by the processor, cause the processor to:
- generate a plurality of overlapping segments of the training dataset, each overlapping segment comprising at least one numerical value shared by at least one other overlapping segment, the autoencoder trained based on the plurality of overlapping segments of the training dataset.

14. The non-transitory computer-readable storage medium of claim 8, the first dataset of a plurality of datasets, the computing model to generate a respective transformed dataset for each dataset of the plurality of datasets, the autoencoder trained based on the plurality of transformed datasets and the plurality of datasets, the training of the autoencoder to comprise reduction of a loss of the autoencoder below a threshold loss value, the computing model comprising one of a neural network and a machine learning model.

15. A method, comprising:
- generating, by a computing model executing on a computer processor, a transformed dataset based on a first dataset comprising numeric values, the computing model to convert the numeric values from a first data type to a second data type;

generating a training dataset comprising the first dataset as an input dataset and the transformed dataset as an output dataset;

training an autoencoder comprising a latent vector to transform the input dataset from the first data type to the second data type;

determining, by a statistical model based on an output of the trained autoencoder and the input dataset, an accuracy of the trained autoencoder;

determining that the accuracy of the trained autoencoder exceeds a threshold accuracy;

receiving, by the trained autoencoder during a first time interval, streaming data comprising numeric values from a processing pipeline;

determining, by the trained autoencoder during the first time interval, a maximum value and a minimum value of a first subset of the numeric values of the streaming data; and normalizing, by the trained autoencoder during the first time interval, a second subset of the numeric values of the streaming data to be within the determined maximum and minimum values, wherein the trained autoencoder normalizes the second subset of the numeric values during the first time interval.

16. The method of claim 15, the first dataset comprising one or more of a row-based dataset having at least one row of numeric values and a column-based dataset having at least one column of numeric values, accuracy of the trained autoencoder based on at least one of: (i) a difference of the output of the autoencoder and the output dataset, and (ii) a classification of the output of the trained autoencoder generated by the statistical model and a classification of the input dataset generated by the statistical model.

17. The method of claim 16, further comprising:
transforming, by the trained autoencoder, streaming data from a processing pipeline from the first data type to the second data type; and
providing, by the trained autoencoder, the transformed streaming data to the processing pipeline.

18. The method of claim 15, wherein the computing model further generates the transformed dataset based on one or more of: (i) normalizing the numeric values of the first data type to be within a range of values of the second data type, (ii) filtering the numeric values to remove at least one of the numeric values, (iii) computing a z-score for each of the numeric values, and (iv) performing an encoding operation on the numeric values, the method further comprising:
receiving, by the autoencoder, the accuracy determined by the statistical model; and
refining the latent vector of the autoencoder based at least in part on the received accuracy and a backpropagation operation.

19. The method of claim 15, further comprising:
generating a plurality of overlapping segments of the training dataset, each overlapping segment comprising at least one numerical value shared by at least one other overlapping segment, the autoencoder trained based on the plurality of overlapping segments of the training dataset.

20. The method of claim 15, the first dataset of a plurality of datasets, the computing model to generate a respective transformed dataset for each dataset of the plurality of datasets, the autoencoder trained based on the plurality of transformed datasets and the plurality of datasets, the training of the autoencoder to comprise reduction of a loss of the autoencoder below a threshold loss value, the computing model comprising one of a neural network and a machine learning model.

* * * * *

UNITED STATES PATENT AND TRADEMARK OFFICE
CERTIFICATE OF CORRECTION

PATENT NO. : 10,853,728 B1  
APPLICATION NO. : 16/549465  
DATED : December 1, 2020  
INVENTOR(S) : Austin Grant Walters and Jeremy Edward Goodsitt Page 1 of 1

It is certified that error appears in the above-identified patent and that said Letters Patent is hereby corrected as shown below:

In the Claims

Column 13, Claim 8, Line 58; Please replace "autoencoder and the input dataset; and" with --autoencoder and the input dataset;--

Signed and Sealed this  
Second Day of February, 2021

Drew Hirshfeld  
*Performing the Functions and Duties of the*  
*Under Secretary of Commerce for Intellectual Property and*  
*Director of the United States Patent and Trademark Office*